United States Patent
Li et al.

(10) Patent No.: US 8,737,847 B2
(45) Date of Patent: May 27, 2014

(54) METHOD AND APPARATUS OF USING JOINT TIMING RECOVERY FOR A COHERENT OPTICAL SYSTEM

(75) Inventors: Chuandong Li, Ottawa (CA); Zhuhong Zhang, Ottawa (CA); Fei Zhu, San Jose, CA (US); Yu Sheng Bai, Los Altos Hills, CA (US)

(73) Assignee: Futurewei Technologies, Inc., Plano, TX (US)

( * ) Notice: Subject to any disclaimer, the term of this patent is extended or adjusted under 35 U.S.C. 154(b) by 130 days.

(21) Appl. No.: 13/423,959

(22) Filed: Mar. 19, 2012

(65) Prior Publication Data

US 2013/0243420 A1    Sep. 19, 2013

(51) Int. Cl.
H04B 10/06 (2006.01)
(52) U.S. Cl.
USPC ............................ 398/202; 398/206; 398/209
(58) Field of Classification Search
USPC ............ 398/25, 65, 152, 154, 155, 202, 205, 398/206, 208, 209
See application file for complete search history.

(56) References Cited

U.S. PATENT DOCUMENTS 7,200,196 B2 *  4/2007  Li et al. .......................... 375/355
8,244,142 B2 *  8/2012  Wagner et al. ................ 398/208
2010/0092168 A1  4/2010  Li et al.
2011/0235762 A1 *  9/2011  Cochran ....................... 375/354
2011/0236025 A1  9/2011  Wagner et al.

FOREIGN PATENT DOCUMENTS

CN   101686085 A    3/2010
WO   2010136068 A1  12/2010
WO   2011103783 A1  11/2011

OTHER PUBLICATIONS

Y. Chen, etc., "Method and Apparatus of Using Time-Domain Interpolators for Sampling Time Adjustment, Sampling Rate Change, and Sampling Misalignment Compensation in Optical Communications," U.S. Appl. No. 13/096,196, filed Apr. 28, 2011, 44 pages.
C. Hwang, "Joint Low-Complexity Blind Equalization, Carrier Recovery and Timing Recovery with Application to Cable Modem," IEICE Trans. Commun., V82-B, No. 1, pp. 120-128.
Z. Xian, etc., "Digital Timing Recovery Combined with Adaptive Equalization for Optical Coherent Receivers," Communications and Photonics Conference and Exhibition (ACP), Asia, 2009, 2 pages.

* cited by examiner

Primary Examiner — Dalzid Singh
(74) Attorney, Agent, or Firm — Conley Rose, P.C.; Grant Rodolph; Jonathan K. Polk

(57) ABSTRACT

An apparatus and method for performing joint equalization and timing recovery in coherent optical systems. The method includes equalizing signals to generate compensated polarization signals, wherein timing error in a distorted optical signal is calculated based on one of the compensated polarization signals. The method further includes performing resampling polarization signals to correct timing offset in an optical signal based on the calculated timing error. The calculated timing error may also be used to adaptively control one or more operating parameters of an external device.

22 Claims, 6 Drawing Sheets

METHOD AND APPARATUS OF USING JOINT TIMING RECOVERY FOR A COHERENT OPTICAL SYSTEM

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Optical communication systems may generally be classified into two detection types known as direct detection and coherent detection. In a direct detection system, data may be modulated using either the magnitude or the phase of the optical signal. In a coherent detection system, data may be modulated using both the magnitude and the phase of the signal, thus allowing greater data transmission rates. As the demand for higher transmission rates increases, data streams may also be modulated using multiple polarizations of optical signals. However, optical signals passing through optical channels are often distorted due to chromatic dispersion, polarization dependent impairment, noise, differential group delay, state of polarization (SOP) rotation, etc. Such distortion may affect the reception of the polarized optical signals and may increase the difficulty in distinguishing between different polarized optical signals.

In what is known as an Intensity Modulation Directly Detected (IMDD) system, distortion may be minimized with a dispersion compensation module (DCM) and polarization control devices, which may compensate corresponding distortions and recover signals. However, as optical communication systems move to higher baud rate requirements, signal quality tends to become more sensitive to distortion, which makes it difficult to recover signals using conventional methods.

SUMMARY

In one embodiment, the disclosure includes an apparatus comprising at least one interpolator configured to interpolate a first polarization component and a second polarization component of an optical signal, an equalizing module coupled to the at least one interpolator and configured to generate a first equalized polarization signal and a second equalized polarization signal based on the first and second interpolated polarization components, and a timing error detector (TED) configured to detect timing error in the optical signal based on one of the first and second equalized polarization signals. In some aspects, the TED may be coupled to the equalizing module at one or more different output ports.

In yet another embodiment, the disclosure includes a network component comprising a processor configured to receive an optical signal, interpolate a horizontal polarization component and a vertical polarization component of the optical signal, equalize the interpolated horizontal and vertical polarization components to generate equalized horizontal and vertical polarization signals, respectively, and calculate a timing error based on one of the equalized horizontal polarization signal and the equalized vertical polarization signal.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems and methods of joint equalization and timing recovery for a coherent optical communications system. The joint timing recovery may be used for optical signals that may be distorted by fiber dispersion and/or polarization mode dispersion (PMD). A distorted optical signal may comprise two polarization signal components, each of which may be compensated via a fractional spaced equalizer, whose tap coefficients may be adaptively adjusted. A timing error detector coupled to the fractional spaced equalizer may calculate timing error based on one of the two compensated polarization components. In turn, the calculated timing error may be used to control an interpolator module such that signals of both polarizations may be resampled to correct timing offsets in the optical signal. The calculated timing error may also be used to control an external device such that a desired sampling frequency may be achieved.

Figure 1:
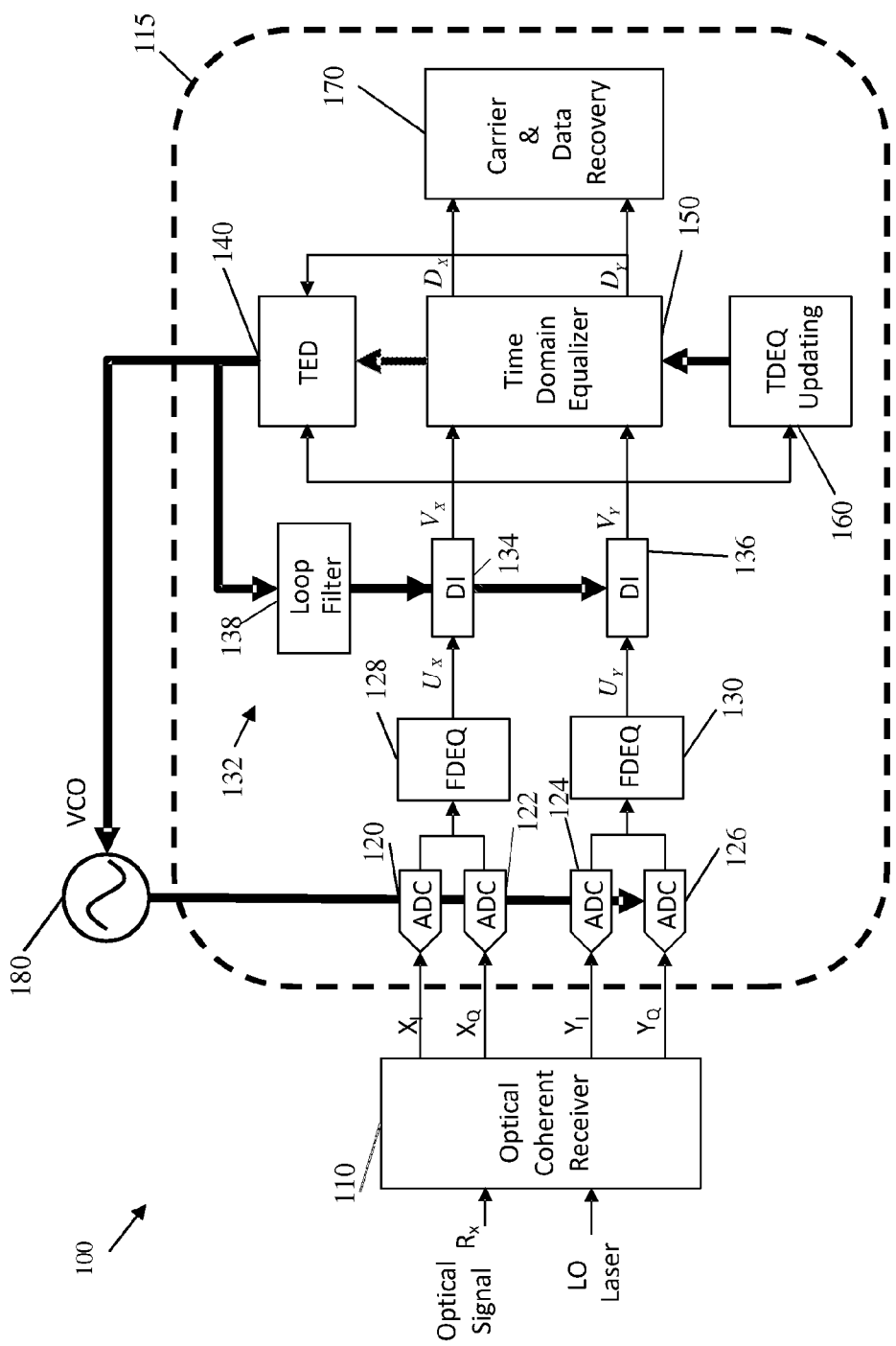
FIG. 1 is a schematic system level block diagram of an embodiment of joint timing recovery.

FIG. 1 illustrates an embodiment of a joint timing recovery system 100, which may be used to recover and compensate distorted optical signals via digital processing. The joint timing recovery system 100 may comprise an optical coherent receiver 110 configured to receive an optical signal Rx from at least one transmitting device (not shown). For instance, a transmitter may transmit the optical signal Rx via an optical channel, which may comprise a plurality of optical fibers, optical filters, amplifiers, or combinations thereof. Such components of an optical channel may introduce undesired signal changes, e.g., chromatic dispersion, nonlinear phase noise, PMD, polarization dependent loss/gain, polarization rotation, optical white Gaussian noise, etc. Thus, the received optical signal Rx may have experienced linear and/or nonlinear distortion, which may need to be removed to effectively recover timing of the signal.

The optical coherent receiver 110 may comprise a laser serving as a local oscillator (LO), from which an optical signal may be mixed with the received optical signal Rx. The mixed optical signals may comprise about two orthogonal phase components, e.g. an in-phase (I) component and a quadratic-phase (Q) component, for each of two orthogonal polarization components, e.g. an X polarization component and a Y polarization component. As shown in FIG. 1, the coherent optical receiver 110 may transmit the mixed optical signals in the form of about four electrical signals, e.g. XI, XQ, YI, and YQ, to a digital signal processing (DSP) unit 115, which may be configured to process the signals and recover data.

The DSP unit 115 may comprise a plurality of analog-to-digital converters (ADCs), including a first ADC 120, a second ADC 122, a third ADC 124, and a fourth ADC 126. One or more of the ADCs 120, 122, 124, and/or 126 may be coupled to at least one frequency domain equalizer (FDEQ), such as a first FDEQ 128 and a second FDEQ 130. The first FDEQ 128 and the second FDEQ 130 may be coupled to a digital timing recovery circuit 132, which may include at least a first digital interpolator (DI) 134, a second DI 136, a loop filter 138, and a timing error detection (TED) module 140. The DSP unit 115 may also comprise at least one time-domain equalizer (TDEQ) 150, a TDEQ updating module 160. In some embodiments, the DSP unit 115 may be implemented with a carrier phase and data recovery module 170, which may be configured to track and compensate carrier frequency and/or phase from transmission signals.

The DSP unit 115 may receive a quadrature (Q) component and an in-phase (I) component for each of the two polarization components (X and Y), where each component may be input into a corresponding ADC. For example, the first ADC 120 may receive the I component XI of an X-polarized signal, the second ADC 122 may receive the Q component XQ of the X-polarized signal, the third ADC 124 may receive the I component YI of a Y-polarized signal, and the fourth ADC 126 may receive the Q component YQ of the Y-polarized signal. The ADCs 120, 122, 124, and 126 may then sample and convert the received signals to digital signals. In some embodiments, the ADCs may sample the received signals at twice the baud rate.

According to one aspect, the first ADC 120 and the second ADC 122 may be configured to provide a digital X-polarized signal to the first FDEQ 128, and the third ADC 124 and the fourth ADC 126 may be configured to provide a digital Y-polarized signal to the second FDEQ 130. The first FDEQ 128 and the second FDEQ 130 may comprise any suitable devices configured to receive signal components from the ADCs 120, 122, 124, and 126 and perform signal conditioning, e.g. to compensate for chromatic dispersion or other signal distortions in the signal components.

After processing the signals received from the respective ADCs 120, 122, 124, and 126, the first FDEQ 128 may generate a first signal UX that is input into the first DI 134, and the second FDEQ 130 may generate a second signal UY that is input into the second DI 136. The first DI 134 and the second DI 136 may perform time-domain interpolation on the respective signals UX and UY based on feedback from the TED module 140. For instance, the first DI 134 and the second DI 136 may utilize timing error signals received from the TED module 140 via the loop filter 138 to perform time recovery operations, e.g., sampling time adjustment to compensate for time errors and/or ADC phase skew compensation to adjust phase misalignments. In some implementations, the loop filter 138 may comprise a proportional structure, an integral structural, or a proportional-and-integral structure, and the loop filter 138 may be configured to smooth timing error signals from the TED module 140.

As shown in FIG. 1, the first DI 134 and the second DI 136 may be coupled to the TDEQ 150, which may be any device that is configured to receive time-domain signals VX and VY output from the first DI 134 and the second DI, respectively. The TDEQ 150 may act as a fractional spaced equalizer (FSE) operable to process signals (e.g., VX and VY) using at least one programmable or adaptive filter such as a finite impulse response (FIR) filter. For instance, the TDEQ 150 equalizes signals based one or one or more TDEQ parameters such as fixed or adaptive tap coefficients. Since TDEQ parameters may vary frequently over time, the TDEQ 150 may be coupled to a TDEQ updating module 160 configured to update (e.g., dynamically, periodically, etc.) TDEQ parameters.

According to one aspect, the TDEQ updating module 160 may receive timing error signals received from the TED module 140 and/or information output from the first DI 134 and the second DI 136 and process the values to provide updated parameters to the TDEQ 150. As such, TDEQ parameters such as tap coefficients of the TDEQ 150 may be adaptively adjusted via the TDEQ updating module 160 to compensate rapidly varying distortion. In some aspects, the TDEQ 150 may comprise a multiple-input and multiple-output (MIMO) equalizer that receives data blocks in signal components and processes the data blocks to improve carrier frequency and/or phase estimation, e.g., by implementing a sequence loop. Furthermore, carrier frequency and/or phase in data streams (e.g., Dx and Dy) output from the TDEQ 150 may be recovered by a carrier phase and data recovery module 170.

As discussed further below, the TDEQ 150 is configured to process signals from the first DI 134 and the second DI 136, and generate compensated polarization signals. Based on a compensated polarization signal, the TED module 140 may calculate timing error and provide feedback information via the loop filter 138 so that the first DI 134 and the second DI 136 may resample signals (e.g., UX and UY) to correct timing offsets in optical signals. In some implementations, the TED module 140 may be coupled to a digital device such as a numerically controlled oscillator (NCO), which may be configured to determine sampling instances based on the calculated timing error.

In other implementations, the TED module 140 may be coupled to an analog device such as a voltage control oscillator (VCO) 180, which may be configured to control timing and sampling frequency of polarized signals based on the calculated timing error. Furthermore, each of the ADCs 120, 122, 124, and 126 may be synchronized to the VCO 180, whose operating point may be adaptively adjusted via control signals transmitted from the TED 140. This analog control path may facilitate in pulling the sampling frequency of the ADCs 120, 122, 124, and 126 at or near a desired sampling rate (e.g., about twice the baud or modulation rate). As a result, timing recovery may be achieved within the DSP unit 115 using a digital timing recovery circuit 132 comprising relatively simple circuitry, while improving overall system stability during steady state operation.

Figure 2:
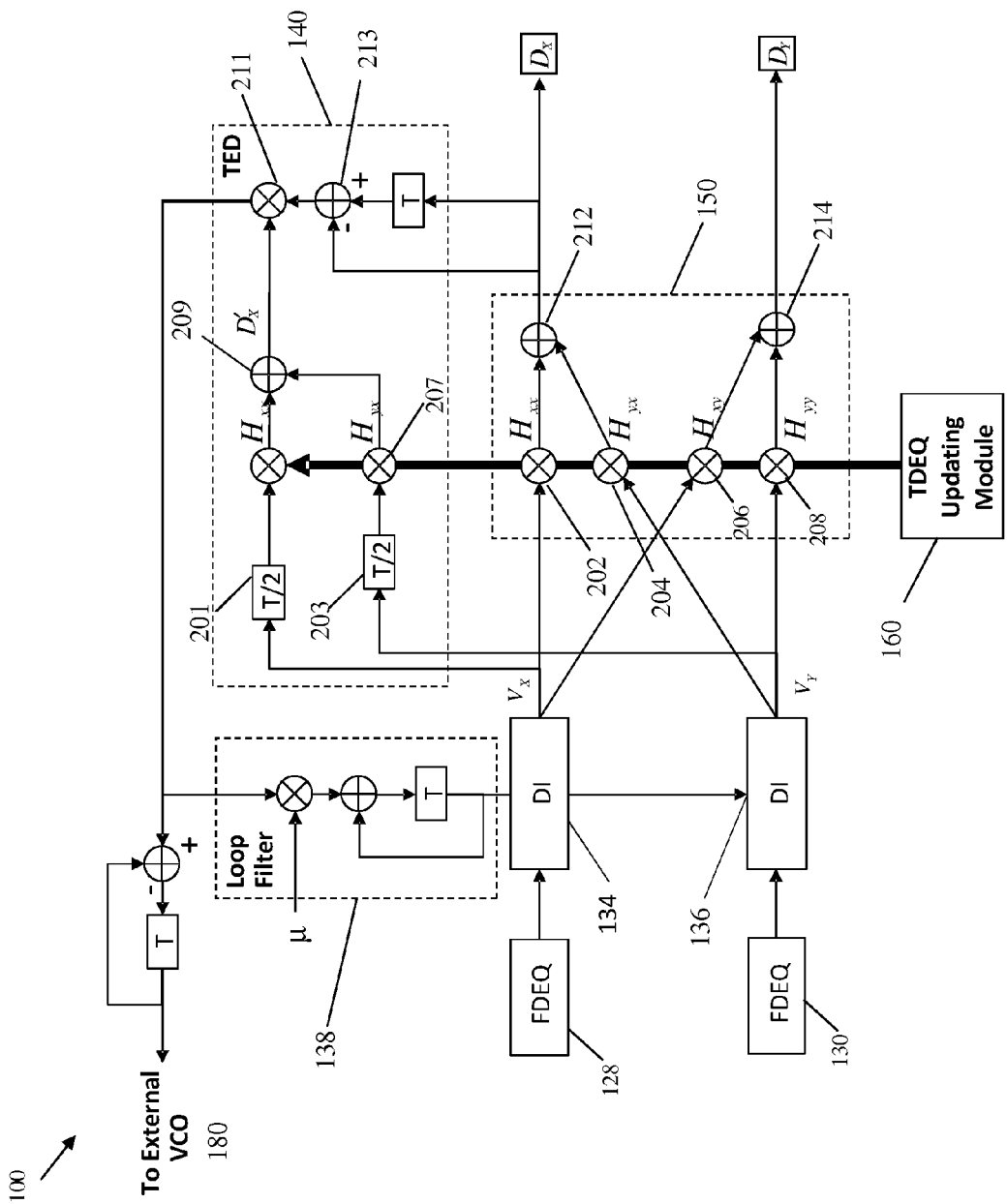
FIG. 2 is a schematic diagram of one embodiment of a joint timing recovery system.

FIG. 2 illustrates a detailed block diagram of the joint timing recovery system 100 shown in FIG. 1. As shown in FIG. 2, the joint timing recovery system 100 may comprise a TDEQ 150 configured to compensate distortion and generate compensated polarization signals, one of which may be used by the TED module 140 to calculate timing error in an optical signal. The calculated timing error may then be used to control the resampling of polarized signals in the first DI 134 and the second DI 136, as well as to control an external component such as an analog device (e.g., VCO 180) or a digital device (e.g., NCO). These and other features will be described in greater detail below.

In some embodiments, the first FDEQ 128 and the second FDEQ 130 may be configured to compensate large and slowly varying distortions, which may be the same on two polarized signals (e.g., an X-polarized signal and a Y-polarized signal). Any residual distortion in these signals may be compensated via the TDEQ 150, which is coupled to the first DI 134 and the second DI 136. The TDEQ 150 may be configured as a butterfly-structured adaptive FIR to deal with crosstalk, and/or may comprise a common FSE whose tap coefficients may be updated by the TDEQ updating module 160. The TDEQ updating module 160 may be configured to adaptively update tap coefficients and/or other TDEQ parameters using any suitable algorithms, e.g., constant modulus algorithm (CMA), Least Mean Square (LMS), Recursive Least Squares (RLS), etc.

The TDEQ 150 may comprise different mathematical operation blocks, such as addition and multiplication blocks, which are indicated by the circles containing the "+" and "x," respectively. According to one aspect, the TDEQ 150 may comprise four multiplication blocks arranged in parallel and configured to receive polarized signals from the first DI 134 and the second DI 136. For example, an X-polarized output signal VX from the first DI 134 may be input into a first multiplication block 202 and a third multiplication block 206, and a Y-polarized output signal VY from the second DI 136 may be input into a second multiplication block 204 and a fourth multiplication block 208.

Based on the TDEQ coefficients, the four multiplication blocks 202, 204, 206, and 208 may use the received input values VX and VY for performing a multiplication or scaling operation to remove crosstalk. As shown in FIG. 2, respective outputs at the first and second multiplication blocks 202 and 204 may be joined at a first addition block 212 to generate a first distortion-reduced polarization signal DX, and respective outputs at the third and fourth multiplication blocks 206 and 208 may be joined at a second addition block 214 to generate a second distortion-reduced polarization signal DY.

In an embodiment, the TED module 140 may be configured to calculate timing error based on a single compensated signal (e.g., DX or DY) output from the TDEQ 150. To this end, the TED module 140 may employ any suitable timing recovery algorithm. As an example, the TED module 140 may employ a Gardner-based method, which calls for a T/2 signal sampling period, where T is equal to one baud period. While the TDEQ 150 is configured to compensate signal distortion and generate a clean signal for timing error detection via the TED module 140, the TDEQ 150 may only generate a clean signal at baud rate. To acquire the middle sampling points called for by the Gardner method, half of a TDEQ signal (corresponding to an output of an X- or Y-polarization signal) may be copied outside of the TDEQ 150, such as at the TED module 140.

For example, FIG. 2 illustrates an example of creating a copy of the X-polarization output signal, DX. However, it is to be understood that the present example is similarly applicable with respect to creating a copy of the Y-polarization output signal, DY. Unlike the input/output data sequence at the TDEQ 150, data passed into the TED module 140 may be delayed or shifted so that the TED module 140 generates a suitable output for calculating timing error. For example, the TED module 140 may comprise a first delay block 201 to delay the X-polarized signal VX from the first DI 134 by half the baud rate, and a second delay block 203 to delay the Y-polarized signal VY from the second DI 136 by half the baud rate (T/2). In other implementations, the first delay block 201 and/or the second delay block 203 may be configured to provide greater or less delays.

Like the TDEQ 150, the TED module 140 may include a first multiplication block 205 and a second multiplication block 207 for scaling the delayed input signals VX and VY (with the same tap coefficients Hxx and Hyx as that used in TDEQ block 150), and an addition block 209 to join the respective outputs. The addition block 209 may be configured to generate an output D'X that corresponds to a middle sampling point of a symbol with distortion being removed. The output DX from the TDEQ 150 may be also be forwarded and scaled after being passed through an adjustment unit 213. Then in block 211, the signal may be multiplied with the output D'X from the addition block 209. In turn, the TED module 140 may analyze and compare the output signals D'X and DX in order to calculate timing error in the received optical signal Rx.

According to one aspect, the TED module 140 may calculate timing error according to the following Gardner equation:

$$e(n) = \text{Re}[D_x(n) - D_x(n-1)] \cdot \text{Re}\left[D'_x\left(n - \frac{1}{2}\right)\right] + \text{Im}[D_x(n) - D_x(n-1)] \cdot \text{Im}\left[D'_x\left(n - \frac{1}{2}\right)\right],$$

where:
  e(n) is the timing-error of the nth received symbol,
  Re denotes the real part of the signal, and
  Im denotes the imaginary part of the signal.

Using the equation above, the TED module 140 may calculate timing error every baud, or every N bauds. Once calculated, the TED module 140 may output a timing error signal e(n) that splits along two paths. For instance, one portion of the timing error signal e(n) may generally travel along an internal path to control the first DI 134 and the second DI 136, while another portion of the timing error signal e(n) may generally travel along an external path to control the VCO 180. As shown in FIG. 2, the portion flowing along the internal path may first pass through the loop filter 138, whose bandwidth may be controlled by a programmable step size p. Moreover, the loop filter 138 may comprise an integral used to reduce any noise within the timing error signal e(n).

After being scaled and/or integrated via the loop filter 138, the timing error signal e(n) may be processed by the first DI 134 and the second DI 136 so that X-polarized signal components (e.g., $U_X$) from the first FDEQ 128 and Y-polarized signal components (e.g., $U_Y$) from the second FDEQ 130 may be resampled based on the recovered timing. Thus, although the timing error signal e(n) is calculated based on only one compensated polarization signal (e.g., $D_X$ or $D_Y$), the timing error signal e(n) may be used to control the first DI 134 and the second DI 136 such that timing recovery operations may be performed on X and Y polarization signals.

As mentioned above, a second portion of the timing error signal e(n) may flow along a second path to control an external device such as the VCO 180. For instance, when a timing offset exists, the portion of the timing error signal e(n) flowing along this external path may act as a control voltage so that the VCO 180 may control timing and sampling frequency of polarized signals. Furthermore, since the TED module 140 and the TDEQ 150 may be dynamically updated via TDEQ update module 160, the operating parameters of the VCO 180 may be adaptively adjusted based on timing error signals from the TED module 140. In this manner, the sampling frequency of the ADCs 120, 122, 124, and 126 may be set or reduced to a desired level.

In the embodiments described herein, it can be seen that timing error may be calculated based on a single polarization signal, wherein the calculated timing error may be used via one or more interpolators (e.g., DIs 134 and 136) to apply time recovery operations on both X- and Y-polarized signals. This configuration may help reduce interaction between the timing recovery loop and the adaptive equalization loop, thereby simplifying design complexity while increasing system robustness. To further reduce interaction between these two loops, the step size in the TDEQ 150 may be set relatively lower than the step size μ in the loop filter 138, in which case the two loops may operate at different bandwidths. Furthermore, because timing error may be calculated from a single compensated polarization signal (e.g., $D_X$ or $D_Y$), the disclosed embodiments may be used for both a polarization multiplex system, and a single polarized optical system.

Figure 3:
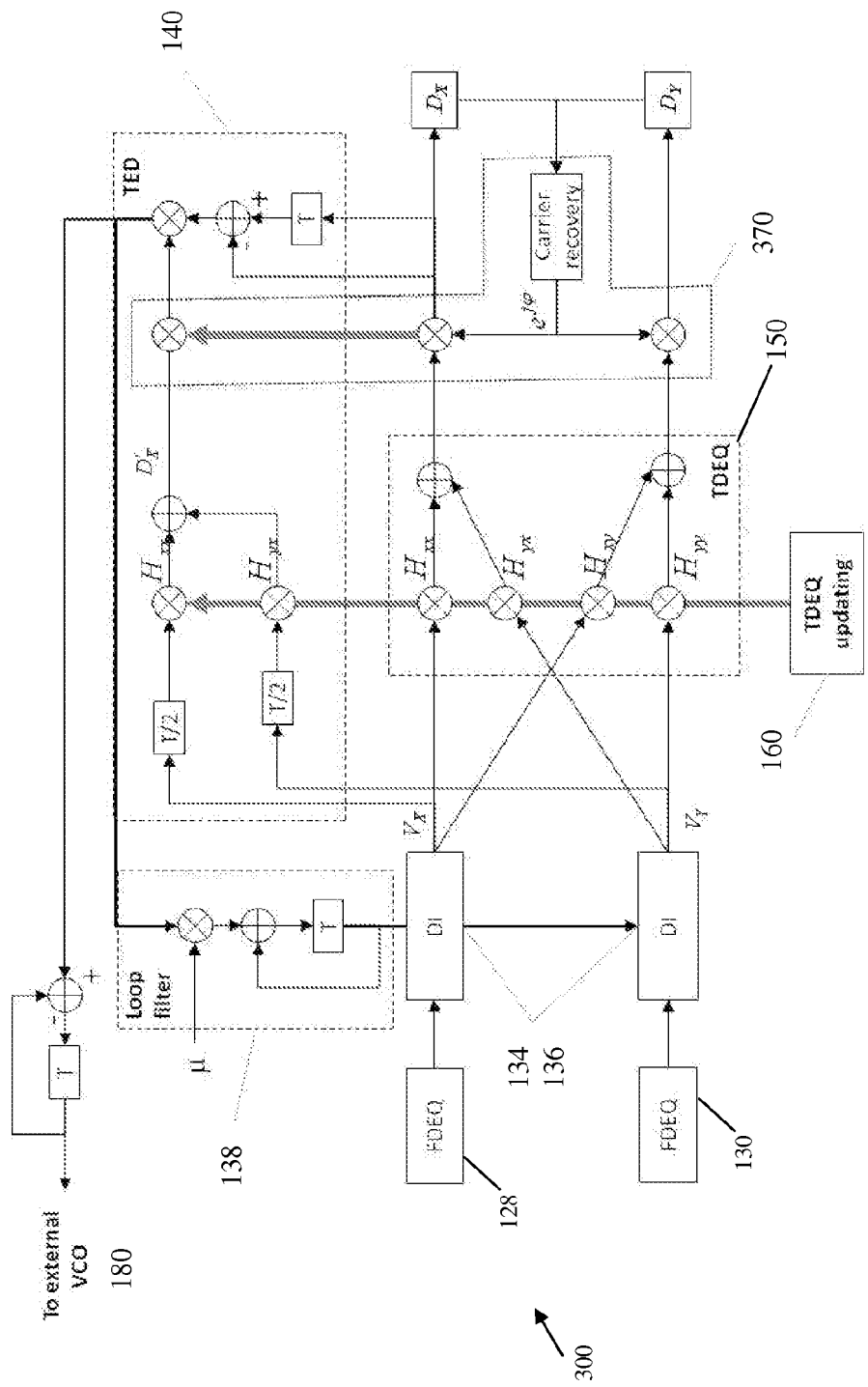
FIG. 3 is a schematic diagram of another embodiment of a joint timing recovery system.

Referring briefly to FIG. 3, another embodiment of a joint timing recovery system 300 is shown. The joint timing recovery system 300 is configured substantially similar to the joint timing recovery system of FIG. 2, except that the joint recovery system 300 comprises a carrier phase and data recovery module 370 such as that described above with respect to FIG. 1. For the sake of clarity, those components of the joint timing recovery system 300 that are identical to those corresponding to the joint timing recovery system 100 of FIG. 2, are denoted by like reference characters and will not be described in detail below.

In FIG. 2, the TED module 140 is shown as being configured to calculate timing error without any carrier recovery. While output signals (e.g., $D_X$ and $D_Y$) at the TDEQ 150 may be compensated for distortions, there may remain carrier phase divergences or misalignments. To recover the carrier phase of an originally transmitted signal, carrier phase may be corrected in the carrier phase and data recovery module 370, the components of which may be arranged as shown in FIG. 3. The carrier phase and data recovery module 370 may implement a first scaling block 301 and a second scaling block 303 to process X- and Y-polarization components of signals output at the TDEQ 150. For instance, the first scaling block 301 and the second scaling block 303 may be configured to scale (e.g., using a factor or exponential term en carrier frequency and/or phase in data streams from the first addition block 212 and the second addition block 214, respectively. Similarly, the carrier phase and data recovery module 370 may comprise a third scaling block 305 scale and correct carrier frequency and/or phase in data outputs (e.g., $D'_X$) at addition block 209. Upon completing carrier recovery via the carrier phase and data recovery module 370, the TED module 140 may proceed to calculate timing error based on a compensated polarization signal in accordance with the techniques described herein.

Figure 4:
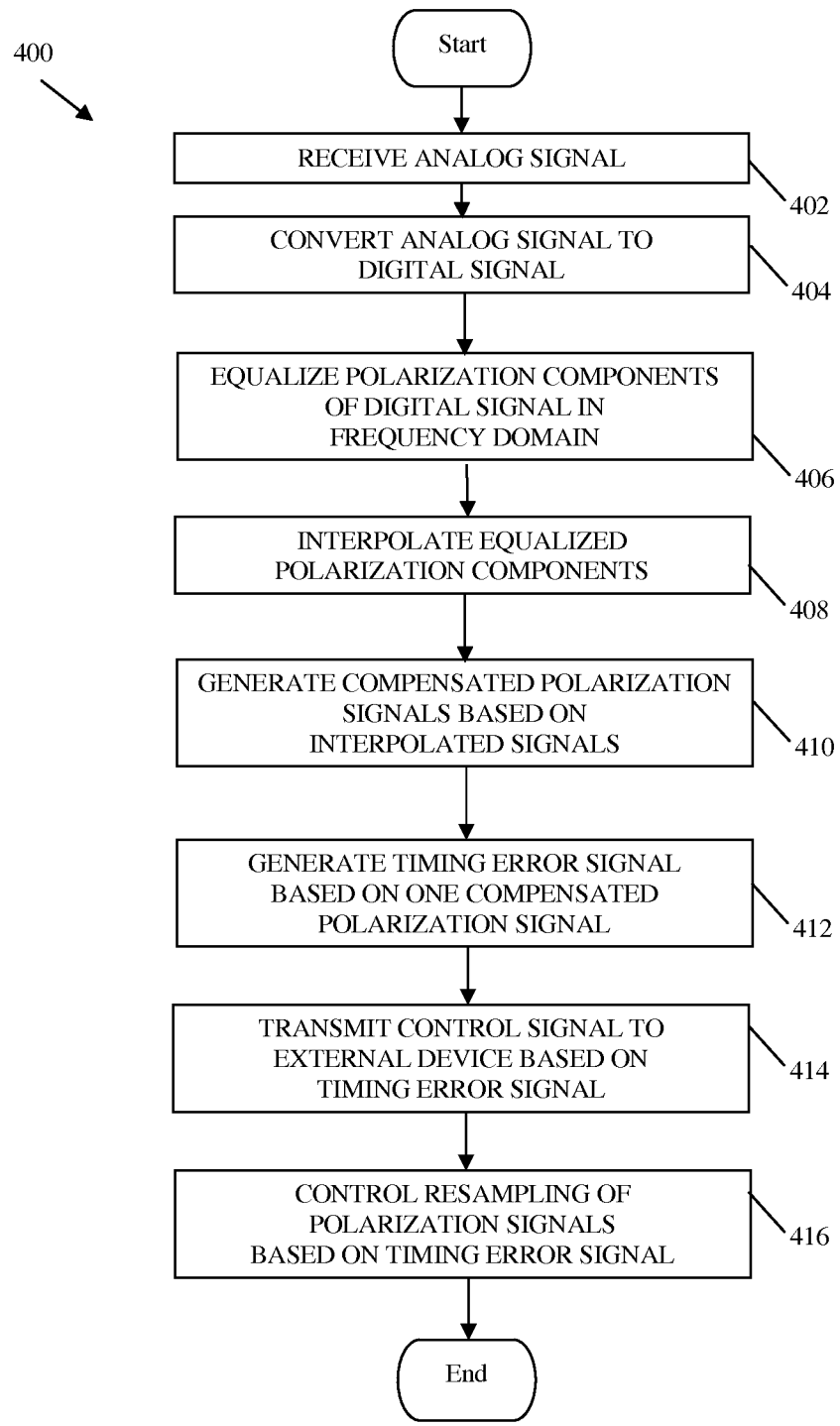
FIG. 4 is a flowchart of an embodiment of a joint timing recovery method.

FIG. 4 is a flowchart of an embodiment of a joint equalization and timing recovery method 400. The method 400 includes receiving an analog signal at block 402. In some embodiments, the analog signal may be transferred into electrical baseband signals corresponding to in-phase (I) and quadrature-phase components. At block 404, the analog signal may be converted into one or more digital signal components. At block 406, the one or more digitized signal components may be equalized (e.g., via one or more frequency-domain equalizers) to compensate for impairments in the signal components. At block 408, the method 400 may perform time-domain interpolation on the equalized signals. In some embodiments, a horizontal polarization interpolator and a vertical polarization interpolator may be configured to perform the time-domain interpolation on the equalized signals.

Continuing with block 410, the method 400 may pass the interpolated output signals into a time-domain equalizing module, which may be configured to compensate for relatively fast varying distortions in the interpolated signals. In turn, the method 400 may output a first compensation polarization signal and a second compensated polarization signal. At block 412, the method 400 may generate a timing error signal based on one of the two compensated signals. At block 414, the method 400 may transmit a control signal to an external device based on the timing error signal, wherein the control signal may be configured to adjust an operating parameter of the external device. At block 416, the timing error signal may be used for resampling signals to correct timing offset. It is to be understood that in some implementations of the method 400, one or more of the foregoing steps may be omitted and/or performed in a different order. Additionally or alternatively, some implementations of the method 400 may include additional steps without departing from the spirit of the present disclosure.

Figure 5:
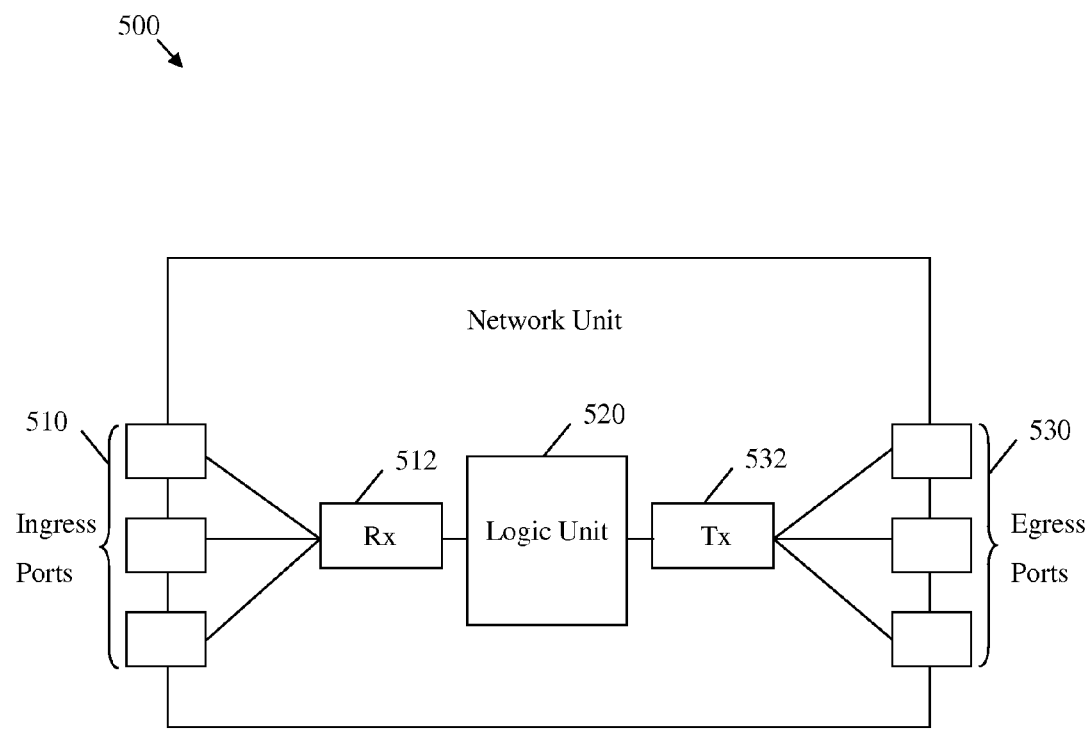
FIG. 5 is a schematic diagram of an embodiment of a general-purpose network component.

FIG. 5 illustrates an embodiment of a network unit 500, which may be any device that transports packets through a network. For instance, the network unit 500 may correspond to any of the components described herein. The network unit 500 may comprise one or more ingress ports 510 coupled to a receiver 512 (Rx), which may be configured for receiving packets or frames, objects, options, and/or Type Length Values (TLVs) from other network components. The network unit 500 may comprise a logic unit or processor 520 coupled to the receiver 512 and configured to process the packets or otherwise determine to which network components to send the packets. The logic unit or processor 520 may be implemented using hardware, software, or both. The network unit 500 may also comprise one or more egress ports 530 coupled to a transmitter 532 (Tx), which may be configured for transmitting packets or frames, objects, options, and/or TLVs to other network components. The logic unit or processor 520, the receiver 512, and the transmitter 532 may also be configured to implement or support any of the schemes and methods described above.

Figure 6:
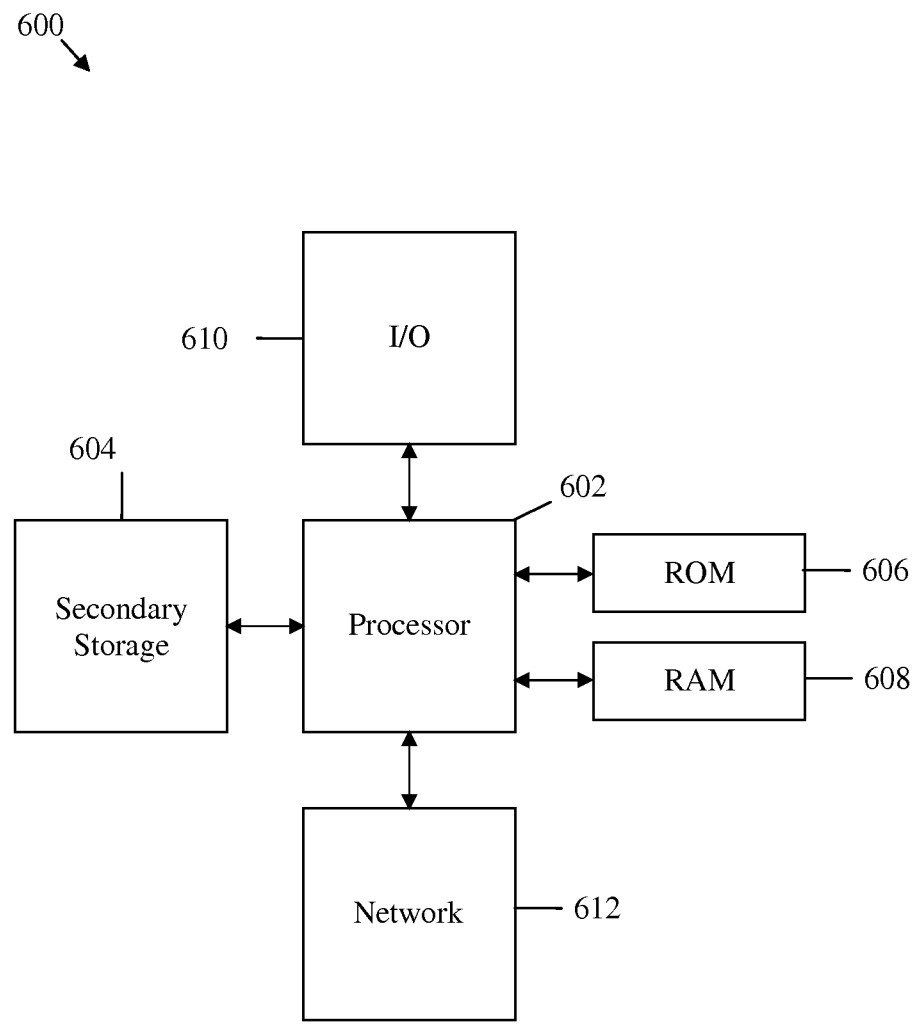
FIG. 6 is a schematic diagram of an embodiment of a general-purpose computer system.

The network components and/or methods described above may be implemented on any general-purpose network component, such as a computer or network component with sufficient processing power, memory resources, and network throughput capability to handle the necessary workload placed upon it. FIG. 6 illustrates a typical, general-purpose network component 600 suitable for implementing one or more embodiments of the components disclosed herein. The network component 600 includes a processor 602 (which may be referred to as a central processor unit or CPU) that is in communication with memory devices including secondary storage 604, read only memory (ROM) 606, random access memory (RAM) 608, input/output (I/O) devices 610, and network connectivity devices 612. The processor 602 may be implemented as one or more CPU chips, or may be part of one or more application specific integrated circuits (ASICs) and/ or digital signal processors (DSPs).

The secondary storage 604 is typically comprised of one or more disk drives or tape drives and is used for non-volatile storage of data and as an over-flow data storage device if RAM 608 is not large enough to hold all working data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage 604. The RAM 608 is used to store volatile data and perhaps to store instructions. Access to both ROM 606 and RAM 608 is typically faster than to second storage 604.

The second storage 604 is typically comprised of one or more disk drives or tape drives and is used for non-volatile storage of data and as an over-flow data storage device if RAM 608 is not large enough to hold all working data. Second storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of second storage 604. The RAM 608 is used to store volatile data and perhaps to store instructions. Access to both ROM 606 and RAM 608 is typically faster than to second storage 604.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 5, 4, etc.; greater than 0.10 includes 0.11, 0.12, 0.15, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k\times(R_u-R_l)$, wherein k is a variable ranging from 1 percent to 100 percent with a 1 percent increment, i.e., k is 1 percent, 2 percent, 5 percent, 4 percent, 5 percent, . . . , 50 percent, 51 percent, 52 percent, . . . , 75 percent, 76 percent, 77 percent, 78 percent, 77 percent, or 100 percent. Moreover, any numerical range defined by two R numbers as defined above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a plurality of interpolators configured to interpolate a first polarization component and a second polarization component of an optical signal;
an equalizing module coupled to the interpolators and configured to generate a first equalized polarization signal and a second equalized polarization signal based on the first and second interpolated polarization components; and
a timing error detector (TED) coupled to the equalizing module and configured to detect timing error in the optical signal based on only one of the first and second equalized polarization signals,
wherein each of the interpolators is further configured to perform a timing error compensation for the optical signal based on the timing error.

2. The apparatus of claim 1, wherein the at least one interpolator is coupled to the TED and is configured to resample first and second polarization signals based on the detected timing error.

3. The apparatus of claim 1, wherein the equalizing module is a time-domain equalizer (TDEQ) comprising a finite impulse response (FIR) digital filter.

4. The apparatus of claim 3, further comprising a TDEQ updating module coupled to the TDEQ and configured to adaptively adjust at least one tap coefficient of the TDEQ.

5. The apparatus of claim 1, wherein the TED is configured to transmit a control signal to vary an output frequency of a voltage-controlled oscillator (VCO), wherein the control signal is based on the detected timing error.

6. An apparatus comprising:
at least one interpolator configured to interpolate a first polarization component and a second polarization component of an optical signal;
an equalizing module coupled to the at least one interpolator and configured to generate a first equalized polarization signal and a second equalized polarization signal based on the first and second interpolated polarization components;
a timing error detector (TED) coupled to the equalizing module and configured to detect timing error in the optical signal based on one of the first and second equalized polarization signals;

at least one analog-to-digital converter (ADC) configured to convert the first and second polarization components of the optical signal into first and second digital polarization signals; and at least one frequency-domain equalizer (FDEQ) coupled to the at least one ADC, wherein the at least one FDEQ is configured to compensate for distortion in the first and second digital polarization components.

7. The apparatus of claim 6, wherein the at least one FDEQ comprises a first FDEQ and a second FDEQ, wherein the at least one interpolator comprises a first digital interpolator (DI) coupled to the first FDEQ and a second DI coupled to the second FDEQ, and wherein the first and second FDEQs are disposed between the at least one ADC and the first and second DIs.

8. A method comprising:
receiving an optical signal with an optical receiver;
interpolating a horizontal polarization component and a vertical polarization component of the optical signal with a plurality of interpolators coupled to the optical receiver;
equalizing the interpolated horizontal and vertical polarization components to generate equalized horizontal and vertical polarization signals, respectively;
calculating a timing error based on only one of the equalized horizontal polarization signal and the equalized vertical polarization signal; and
performing, by each of the interpolators, a timing error compensation for the optical signal based on the timing error.

9. The method of claim 8, further comprising resampling horizontal and vertical polarization signals based on the calculated timing error to correct timing offset in the optical signal.

10. The method of claim 9, further comprising adaptively adjusting at least one tap coefficient used to equalize the interpolated horizontal and vertical polarization components, wherein the at least one tap coefficient is adaptively adjusted based on the calculated timing error, the resampled horizontal and vertical polarization signals, or a combination thereof.

11. The method of claim 8, further comprising transmitting a control signal to an external analog device, wherein the control signal is based on the calculated timing error and is configured to control an output frequency of the analog device.

12. The method of claim 8, further comprising sampling analog components of the optical signal at a rate according to the output frequency of the analog device, wherein the control signal is configured to vary the output frequency of the analog device such that the sampling rate is equal to twice the baud rate.

13. The method of claim 8, further comprising:
inputting the interpolated horizontal and vertical polarization components into a time error detector (TED) configured to calculate the timing error; and
generating, at the TED, a copy of one of the equalized horizontal polarization signal or the equalized vertical polarization signal based on the interpolated horizontal and vertical polarization components.

14. The method of claim 8, wherein the horizontal polarization component is an X-polarized component, wherein the vertical polarization component is a Y-polarized component, wherein the plurality of interpolators comprises only a first interpolator for the X-polarized component and a second interpolator for the Y-polarized component, wherein the equalized horizontal polarization signal is an equalized X-polarized signal, and wherein the timing error is calculated based on only the equalized X-polarized signal.

15. A method comprising:
receiving an optical signal with an optical receiver;
interpolating a horizontal polarization component and a vertical polarization component of the optical signal with at least one interpolator coupled to the optical receiver;
equalizing the interpolated horizontal and vertical polarization components to generate equalized horizontal and vertical polarization signals, respectively;
calculating a timing error based on one of the equalized horizontal polarization signal and the equalized vertical polarization signal; and
compensating for distortion in the horizontal and vertical polarization components of the optical signal, wherein the horizontal and vertical polarization components are compensated in a frequency-domain prior to being interpolated.

16. A method comprising:
receiving an optical signal with an optical receiver;
interpolating a horizontal polarization component and a vertical polarization component of the optical signal with at least one interpolator coupled to the optical receiver;
equalizing the interpolated horizontal and vertical polarization components to generate equalized horizontal and vertical polarization signals, respectively;
calculating a timing error based on one of the equalized horizontal polarization signal and the equalized vertical polarization signal;
inputting the interpolated horizontal and vertical polarization components into a time error detector (TED) configured to calculate the timing error;
generating, at the TED, a copy of one of the equalized horizontal polarization signal or the equalized vertical polarization signal based on the interpolated horizontal and vertical polarization components; and
delaying the input of the horizontal and vertical interpolated polarization components into the TED such that the copy of the equalized horizontal or vertical polarization component corresponds to a middle sampling point, wherein the middle sampling point is used to calculate the timing error.

17. The method of claim 16, wherein the input of the horizontal and vertical interpolated polarization components is delayed by a rate equal to one-half of a baud.

18. An apparatus comprising:
a plurality of analog-to-digital converters (ADCs);
at least one frequency-domain equalizer (FDEQ) coupled to the plurality of ADCs;
at least one interpolator coupled to the at least one FDEQ;
a time-domain equalizer (TDEQ) coupled to the at least one interpolator, wherein the at least one interpolator is disposed between the TDEQ and the at least one FDEQ; and
a timing error detector (TED) coupled to the TDEQ.

19. The apparatus of claim 18, further comprising a loop filter coupled to the TED and the at least one interpolator, wherein the loop filter is disposed between the TED and the at least one interpolator.

20. The apparatus of claim 19, wherein the at least one FDEQ comprises a first FDEQ and a second FDEQ, wherein the at least one interpolator comprises a first digital interpolator (DI) coupled to the first FDEQ and a second DI coupled to the second FDEQ, wherein the first FDEQ is disposed between the at least one ADC and the first DI, and wherein the second FDEQ is disposed between the at least one ADC and the second DI.

21. The apparatus of claim 20, further comprising an optical receiver coupled to the plurality of ADCs, wherein the plurality of ADCs comprise at least one ADC coupled to the first FDEQ and at least one ADC coupled to the second FDEQ.

22. The apparatus of claim 18, further comprising:
a carrier recovery module coupled to the TDEQ and the TED; and
an updating module coupled to the TDEQ, wherein the TDEQ is disposed between the updating module and the TED.

* * * * *

UNITED STATES PATENT AND TRADEMARK OFFICE
CERTIFICATE OF CORRECTION

PATENT NO.         : 8,737,847 B2
APPLICATION NO.    : 13/423959
DATED              : May 27, 2014
INVENTOR(S)        : Chuandong Li et al.

It is certified that error appears in the above-identified patent and that said Letters Patent is hereby corrected as shown below:

In the claims:

Column 11, Lines 47-52, Claim 12, should read as:
"12. The method of claim 8, further comprising sampling analog components of the optical signal at a rate according to the output frequency of the analog device, wherein the control signal is configured to vary the output frequency of the analog device such that the sampling rate is equal to twice a baud rate."

Signed and Sealed this
Twenty-first Day of October, 2014

Michelle K. Lee
*Deputy Director of the United States Patent and Trademark Office*